(12) United States Patent
Miura et al.

(10) Patent No.: US 11,465,372 B2
(45) Date of Patent: Oct. 11, 2022

(54) DRY TAPE MATERIAL FOR FIBER PLACEMENT, METHOD OF MANUFACTURING THE SAME, AND REINFORCING FIBER LAMINATE AND FIBER-REINFORCED PLASTIC MOLDED BODY PRODUCED WITH THE SAME

(71) Applicant: Toray Industries, Inc., Tokyo (JP)

(72) Inventors: Shingo Miura, Nagoya (JP); Masayuki Sato, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 59 days.

(21) Appl. No.: 16/971,034

(22) PCT Filed: Feb. 22, 2019

(86) PCT No.: PCT/JP2019/006728
§ 371 (c)(1),
(2) Date: Aug. 19, 2020

(87) PCT Pub. No.: WO2019/171982
PCT Pub. Date: Sep. 12, 2019

(65) Prior Publication Data
US 2020/0391450 A1    Dec. 17, 2020

(30) Foreign Application Priority Data
Mar. 6, 2018   (JP) .............................. JP2018-039436

(51) Int. Cl.
*B29C 70/34*    (2006.01)
*B29B 11/16*    (2006.01)
(Continued)

(52) U.S. Cl.
CPC .............. *B29C 70/34* (2013.01); *B29B 11/16* (2013.01); *B29C 70/386* (2013.01); *B32B 5/26* (2013.01);
(Continued)

(58) Field of Classification Search
CPC ....... B29B 11/16; B29B 15/122; B29C 70/34; B29C 70/386; B32B 2262/106;
(Continued)

(56) References Cited

U.S. PATENT DOCUMENTS

2012/0015135 A1    1/2012  Beraud et al.
2015/0375461 A1*  12/2015  Blackburn ............... D04H 3/04
                                                         156/181

(Continued)

FOREIGN PATENT DOCUMENTS

EP    2 799 470 A1    11/2014
EP    3 798 254 A1     3/2021
(Continued)

OTHER PUBLICATIONS

The Extended European Search Report dated Oct. 15, 2021, of counterpart European Patent Application No. 19764127.7.
(Continued)

*Primary Examiner* — Camie S Thompson
(74) *Attorney, Agent, or Firm* — DLA Piper LLP (US)

(57) ABSTRACT

A dry tape material for fiber placement includes a plurality of reinforcing fiber strands that satisfy (i) to (iii): (i) the reinforcing fiber strand has thicknesses T1 and T3 at both ends in a width direction of a section of the reinforcing fiber strand, and both T1 and T3 are 50 to 200% relative to a thickness T2 at a central portion of the reinforcing fiber strand, (ii) the reinforcing fiber strand has a number of filaments N and a width W that satisfy a relationship of 4.8<N/W<12, and (iii) the reinforcing fiber strand has a form kept by a first resin material having a glass transition temperature Tg or a melting point Tm of 40° C. to 200° C., the first resin material being heat-meltable, wherein the plurality of reinforcing fiber strands are bound and integrated with each other by a second resin material.

10 Claims, 6 Drawing Sheets

(51) Int. Cl.
- *B29C 70/38* (2006.01)
- *B32B 5/26* (2006.01)
- *B32B 27/08* (2006.01)
- *B32B 27/12* (2006.01)
- *C08J 5/04* (2006.01)
- *B29K 105/08* (2006.01)
- *B29K 307/04* (2006.01)

(52) U.S. Cl.
CPC .............. *B32B 27/08* (2013.01); *B32B 27/12* (2013.01); *C08J 5/046* (2013.01); *B29K 2105/0872* (2013.01); *B29K 2307/04* (2013.01); *B32B 2262/106* (2013.01); *B32B 2305/076* (2013.01); *B32B 2305/08* (2013.01); *C08J 2387/00* (2013.01); *C08J 2487/00* (2013.01)

(58) Field of Classification Search
CPC ..... B32B 2305/08; B32B 27/08; B32B 27/12; B32B 5/24; C08J 5/046; C08J 5/06; C08J 2400/22; C08J 2377/00; C08J 2300/22; D04H 1/58; D04H 1/587; D04H 1/593; D04H 1/74; D04H 3/12; C08L 2201/50; B29K 2063/00; B29K 2071/00; B29K 2075/00; B29K 2077/00; B29K 2081/06; B29K 2105/0881
USPC ....... 156/283, 181; 428/300.7, 114; 264/258
See application file for complete search history.

(56) References Cited

U.S. PATENT DOCUMENTS

2017/0297295 A1* 10/2017 Bhatnagar ............... B32B 5/022
2017/0320293 A1* 11/2017 Johanson .................. B32B 7/14

FOREIGN PATENT DOCUMENTS

| | | |
|---|---|---|
| JP | 2005-280348 | 10/2005 |
| JP | 2012-510385 | 5/2012 |
| JP | 2016-179547 | 10/2016 |
| JP | 2018-501121 | 1/2018 |
| WO | 2017/083631 | 5/2017 |

OTHER PUBLICATIONS

Campus: "Campus Datasheet Grilamid TR 55—PA12/MACMI, EMS-GRIVORY | a unit of EMS-CHEMIE AG," Aug. 2017, pp. 1-7, Retrieved from the Internet: https://www.campusplastics.com/material/pdf/67121/GrilamidTR55?sLg=en, on Oct. 4, 2021.

First Office Action dated Jun. 20, 2022, of counterpart Chinese Patent Application No. 201980012678.2, along with an English translation.

Notice of Reasons for Refusal dated Aug. 23, 2022, of counterpart Japanese Patent Application No. 2019-517119, along with an English translation.

* cited by examiner

DRY TAPE MATERIAL FOR FIBER PLACEMENT, METHOD OF MANUFACTURING THE SAME, AND REINFORCING FIBER LAMINATE AND FIBER-REINFORCED PLASTIC MOLDED BODY PRODUCED WITH THE SAME

TECHNICAL FIELD

This disclosure relates to a reinforcing fiber tape material, a reinforcing fiber laminate produced by placing and stacking the reinforcing fiber tape materials, a molded product of the reinforcing fiber laminate, and a method of manufacturing a reinforcing fiber tape material.

BACKGROUND

Fiber reinforced plastic (FRP) including a reinforcing fiber and a resin is used for aviation, space, automobiles and the like because FRP has the properties such as the light weight and the high strength. Examples of the method of molding that achieves both the high productivity and the high strength of FRP include a method of resin transfer molding (RTM) and a method of vacuum-assisted resin transfer molding (VaRTM) in which a resin is later impregnated into a reinforcing fiber laminate and cured. The method of RTM is a method of molding FRP by later impregnating and curing a matrix resin, in which a reinforcing fiber laminate including a reinforcing fiber substrate including a group of dry reinforcing fiber bundles that are not preimpregnated with a matrix resin is placed in a mold, and a liquid matrix resin having a low viscosity is injected. When a particularly high productivity is required, for example, a technique of shortening the time for molding fiber reinforced plastic is used in which the size of a cavity in a mold is set larger than the thickness of a final molded product during the injection of a resin and a reinforcing fiber laminate is impregnated at a high speed by closing the mold. In recent years, a method of wet press molding has also been used in which a liquid resin is applied to a reinforcing fiber laminate, and then a mold is clamped to impregnate the resin into the reinforcing fiber laminate.

A reinforcing fiber laminate molded by impregnating and curing a resin has been traditionally formed by cutting out a desired shape from a reinforcing fiber substrate such as a woven fabric or a non crimp fabric (NCF) that includes a group of dry reinforcing fiber bundles impregnated with no resin and has a fabric form having a certain width (that is, a substantially rectangular shape), and by draping and sticking the cut-out product into a three-dimensional shape. However, after the desired shape is cut out from the fabric having a certain width, a large amount of remaining end material is generated. That is, the quantity of the reinforcing fibers discarded is increased. As described above, in the conventional method in which a reinforcing fiber substrate that has a fabric form having a certain width is manufactured in advance, there is a problem that the manufacturing cost is high.

To solve such a problem, a method of fiber placement has been attracting attention. In that method, a reinforcing fiber bundle is placed only at a necessary portion to obtain a desired shape that matches a product shape. By the method of fiber placement, a required quantity of reinforcing fibers is placed at a necessary portion so that the quantity of the reinforcing fibers discarded can be significantly reduced. Furthermore, the reinforcing fiber substrate manufactured by the method of fiber placement has fewer crimps in the reinforcing fiber bundle and better straightness of the bundle than conventional woven fabrics and NCFs so that the FRP obtained by injection and curing of a resin has a high mechanical strength.

As a conventional technique relating to a dry tape material used in the method of fiber placement, for example, Japanese Translation of PCT International Application Publication No. 2012-510385 has proposed a material with which the end of a tape is not frayed and the tape includes a strand having the standard deviation of the width of 0.25 mm or less, and a method of manufacturing the material.

Japanese Translation of PCT International Application Publication No. 2017-521291 has proposed a dry tape material with which the change in the thickness of a strand can be suppressed from the time of producing a preform to a molding process of injecting and impregnating a resin into the preform to form a fiber-reinforced plastic molded body, and a method of manufacturing the dry tape material. In that technique, two types of binders are used to fix the entire inside of a unidirectional fiber bundle so that low bulk properties that approximate the final thickness of the fiber-reinforced plastic molded body can be achieved.

Regarding a technique of controlling the width of a carbon fiber bundle, Japanese Patent Laid-open Publication No. 2005-280348 has proposed a technique in which the fiber width is spread, and then narrowed. In that publication, the width of 12 K of a reinforcing fiber bundle is controlled to be 7.9 mm by spreading and narrowing the fiber width.

However, the reinforcing fiber substrate manufactured by the method of fiber placement has few resin flow paths due to the straightness of the reinforcing fiber bundle during the injection of a resin, and has an extremely poor impregnation property compared to conventional woven fabrics and NCFs. When the impregnation property is poor, the time required for the injection of a resin is long in the injection molding so that the production cycle is long and the advantage of the high productivity in the injection molding is lost. In the injection molding, it is necessary to complete the injection of a resin before the resin to be injected becomes highly viscous (that is, within the pot life). In the reinforcing fiber substrate having a poor impregnation property, the usable resin and the process are limited.

In particular, in the method of fiber placement, a dry tape material is pressed toward the surface direction by a guide roller and placed on a mold while receiving the pressure from a placement roller so that there is a possibility that the original width of the tape will change. When the gap between the reinforcing fiber bundles are filled through the change in the original width of the tape, the resin flow path is blocked, and a resin hardly flows at high speed in the reinforcing fiber substrate during the resin injection molding. Therefore, the dry tape material to be placed is required to be a material having excellent dimensional stability and capable of ensuring the resin flow path in the reinforcing fiber substrate.

Meanwhile, the dry tape material is required to be a material that can be placed in a narrow width to ensure a large number of resin flow paths by the gaps between the adjacent strands. Therefore, the width of the reinforcing fiber strand included in the dry tape material is controlled during the process of manufacturing the reinforcing fiber strand. However, when the reinforcing fiber strand passes through the process of narrowing the width, the end is rubbed and raised or inclined to one side so that the reinforcing fiber strand tends to have a less uniform thickness in the end than in the central portion. In particular during the placement by the method of fiber placement, the dry tape material including the reinforcing fiber strand wound up in such a manner has a width that is changed from the original width of the tape when the material is placed on the mold while receiving the pressure from the placement roller so that the impregnation property as a reinforcing fiber substrate is also deteriorated.

In Japanese Translation of PCT International Application Publication No. 2012-510385, the interval between the fiber bundles can be constant during placing the tape material and, for example, the reinforcing fiber bundle including 24 K filaments that constitute the tape has a width of 5 to 12 mm. When a tape including such a reinforcing fiber bundle is placed in one direction by the method of fiber placement, so many fine flow paths are not formed between the fiber bundles since the reinforcing fiber bundle has a width of 5 mm or more so that the resin fluidity cannot be sufficiently ensured during the molding. Furthermore, in the process of manufacturing the reinforcing fiber bundle, there is a problem that the end of the reinforcing fiber strand is raised due to the adjustment of the width, and the dimensions of the width and the thickness are changed during pressing the reinforcing fiber strand in the process of the placing. Therefore, particularly when a resin flows at high speed, the reinforcing fiber bundle is easily unimpregnated, while the obtained FRP has a resin rich region formed around the reinforcing fiber bundle and is easily broken from the resin rich region, and there is a concern that the mechanical strength will be deteriorated.

In Japanese Translation of PCT International Application Publication No. 2017-521291, although a tape having a width of 0.1 to 61 cm is proposed, the tape is not produced by narrowing a strand having a specific number of filaments into one tape, but produced by slitting a web-like material and dividing the number of filaments to narrow the width. Therefore, there is a concern that productivity will be significantly deteriorated. Furthermore, the tape-shaped material suppresses the change in the thickness of the reinforcing fiber strand, and there remains a problem regarding the width change and the dimensional stability during the process of placing a dry tape material.

Japanese Patent Laid-open Publication No. 2005-280348 ensures the quality stability of the woven fabric obtained in the subsequent process by controlling the width of a reinforcing fiber bundle, but is not to produce a tape material for fiber placement. Furthermore, the reinforcing fiber bundle obtained cannot suppress the change in the thickness and the width, and the ratio N/W of the width W [mm] to the number of filaments N [K] is also 1.6 or less. Even if the reinforcing fiber bundle is used as a tape for fiber placement, a fine flow path is not formed and the resin fluidity cannot be ensured.

It could therefore be helpful to provide a tape material that provides a good impregnation property with a resin in aligning the tape material to produce a reinforcing fiber substrate, a high productivity suitable for the method of fiber placement, and a high mechanical strength when molded, a method of manufacturing the tape material, a laminate sheet substrate (reinforcing fiber laminate) obtained from such a tape material and a fiber-reinforced plastic molded body obtained from the sheet substrate.

SUMMARY

We thus provide:
(1) A dry tape material for fiber placement, including a plurality of reinforcing fiber strands that satisfy (i) to (iii) below:
  (i) the reinforcing fiber strand has thicknesses T1 ($\mu$m) and T3 ($\mu$m) at both ends in a width direction of a section of the reinforcing fiber strand, and both T1 and T3 are within a range of 50 to 200% relative to a thickness T2 ($\mu$m) at a central portion of the reinforcing fiber strand;
  (ii) the reinforcing fiber strand has a number of filaments N [unit: K] and a width W [mm] that satisfy a relationship of $4.8 < N/W < 12$; and
  (iii) the reinforcing fiber strand has a form kept by a first resin material that has a glass transition temperature Tg or a melting point Tm of 40° C. or more and 200° C. or less, the first resin material being heat-meltable,
  wherein the plurality of reinforcing fiber strands are bound and integrated with each other by a second resin material.
(2) The dry tape material for fiber placement according to (1) above, wherein the reinforcing fiber strand has a gap between an adjacent reinforcing fiber strand and is placed parallel to a longitudinal direction of the reinforcing fiber strand.
(3) The dry tape material for fiber placement according to (1) or (2) above, wherein the first resin material is adhered to and partially impregnated into the reinforcing fiber strand in a state of being visible on a surface of the reinforcing fiber strand, or impregnated into an inside of the reinforcing fiber strand in a state of being invisible on the surface so that the first resin material fixes and binds a plurality of reinforcing fiber filaments included in the reinforcing fiber strand.
(4) A dry tape material for fiber placement, including a reinforcing fiber strand that satisfies (i) to (iii) below:
  (i) the reinforcing fiber strand has thicknesses T1 ($\mu$m) and T3 ($\mu$m) at both ends in a width direction of a section of the reinforcing fiber strand, and both T1 and T3 are within a range of 50 to 200% relative to a thickness T2 ($\mu$m) at a central portion of the reinforcing fiber strand;
  (ii) the reinforcing fiber strand has a number of filaments N [unit: K] and a width W [mm] that satisfy a relationship of $4.8 < N/W < 12$; and
  (iii) the reinforcing fiber strand has a form kept by a first resin material that has a glass transition temperature Tg or a melting point Tm of 40° C. or more and 200° C. or less, the first resin material being heat-meltable,
  wherein the reinforcing fiber strand is bound and integrated by a second resin material.
(5) A reinforcing fiber laminate including the dry tape materials for fiber placement according to any one of (1) to (4) above arranged and laminated, wherein layers of the dry tape materials are stuck to one another.
(6) A fiber-reinforced plastic molded body including the reinforcing fiber laminate according to (5) above and a matrix resin impregnated into the reinforcing fiber laminate and cured.
(7) A method of manufacturing a dry tape material for fiber placement, the method including binding and integrating a plurality of reinforcing fiber strands with each other by a second resin material, the plurality of reinforcing fiber strands produced by (i) and (ii) below in order:
  (i) adjusting a thickness of a section of the reinforcing fiber strand so that the reinforcing fiber strand has thicknesses T1 ($\mu$m) and T3 ($\mu$m) at both ends in a width direction of the section, and both T1 and T3 are within a range of 50 to 200% relative to a thickness T2 ($\mu$m) at a central portion in the width direction, and adjusting a width of the section so that the reinforcing fiber strand has a number of filaments N [unit: K] and a width W [mm] that satisfy a relationship of 4.8<N/W<12; and (ii) placing a first resin material on a surface of the reinforcing fiber strand, the first resin material having a glass transition temperature Tg or a melting point Tm of 40° C. or more and 200° C. or less and being heat-meltable, and heating and cooling the first resin material to obtain the reinforcing fiber strand.

(8) A method of manufacturing a dry tape material for fiber placement, the method including binding and integrating a reinforcing fiber strand by a second resin material, the reinforcing fiber strand produced by (i) and (ii) below in order:

(i) adjusting a thickness of a section of the reinforcing fiber strand so that the reinforcing fiber strand has thicknesses T1 (μm) and T3 (μm) at both ends in a width direction of the section, and both T1 and T3 are within a range of 50 to 200% relative to a thickness T2 (μm) at a central portion in the width direction, and adjusting a width of the section so that the reinforcing fiber strand has a number of filaments N [unit: K] and a width W [mm] that satisfy a relationship of 4.8<N/W<12; and (ii) placing a first resin material on a surface of the reinforcing fiber strand, the first resin material having a glass transition temperature Tg or a melting point Tm of 40° C. or more and 200° C. or less and being heat-meltable, and heating and cooling the first resin material to obtain the reinforcing fiber strand.

(9) The method of manufacturing a dry tape material for fiber placement according to (7) or (8) above, wherein the first resin material placed on the surface has a particle shape in (ii) above.

Our tape material and the laminate sheet substrate (reinforcing fiber laminate) can provide a good impregnation property with a resin when used for a reinforcing fiber substrate, and a high productivity suitable for the method of fiber placement, as well as a high mechanical strength in a molded body produced by injecting a resin.

Furthermore, by using the tape material produced by our method, the productivity and the mechanical property of the FRP can be improved and, in addition, the types of resins to be injected and the variety of the process window can be increased.

DESCRIPTION OF REFERENCE SIGNS

Figure 1A:
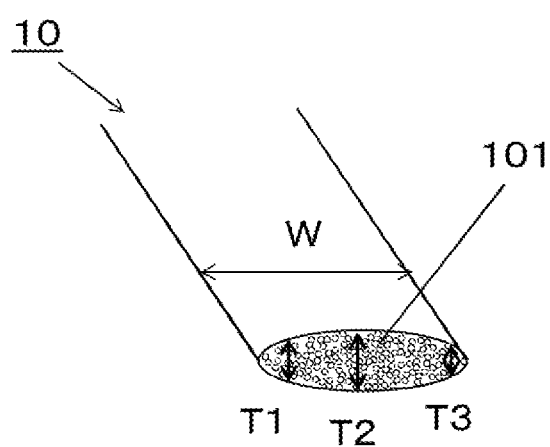
FIGS. 1(a) and 1(b) are schematic views of a reinforcing fiber strand included in a carbon fiber tape material (dry tape material) according to one example and of a reinforcing fiber filament assembly being a precursor of the reinforcing fiber strand.

10: Reinforcing fiber strand
20: Reinforcing fiber filament assembly
30, 40: Dry tape material
50, 60: Dry tape material
70: Reinforcing fiber laminate
80: Dry tape material
101: Reinforcing fiber filament
102: Particle containing heat-meltable resin as main component
103: Nonwoven fabric containing heat-meltable resin as main component
104: Particle
105: Nonwoven fabric

DETAILED DESCRIPTION

The dry tape material is
a dry tape material for fiber placement including a plurality of reinforcing fiber strands that satisfy (i) to (iii) below wherein the plurality of reinforcing fiber strands are bound and integrated with each other by a second resin material, or
a dry tape material for fiber placement including a reinforcing fiber strand that satisfies (i) to (iii) below wherein the reinforcing fiber strand is bound and integrated by the second resin material.

(i) The reinforcing fiber strand has thicknesses T1 (μm) and T3 (μm) at both ends in a width direction of a section of the reinforcing fiber strand, and both T1 and T3 are within a range of 50 to 200% relative to a thickness T2 (μm) at a central portion of the reinforcing fiber strand.

(ii) The reinforcing fiber strand has a number of filaments N [unit: K] and a width W [mm] that satisfy a relationship of 4.8<N/W<12.

(iii) The reinforcing fiber strand has a form kept by a first resin material that has a glass transition temperature Tg or a melting point Tm of 40° C. or more and 200° C. or less, the first resin material being heat-meltable.

The reinforcing fiber is not particularly limited and, for example, carbon fibers, glass fibers, aramid fibers, alumina fibers, silicon carbide fibers, boron fibers, metal fibers, natural fibers, mineral fibers and the like can be used. The reinforcing fibers may be used singly or in combination of two or more kinds thereof. Among the reinforcing fibers, carbon fibers such as polyacrylonitrile (PAN)-based, pitch-based, and rayon-based carbon fibers can be preferably used from the viewpoints of the high specific strength and the specific rigidity of the molded body and the weight reduction. From the viewpoint of enhancing the economical efficiency of the obtained molded product, glass fibers can be preferably used. From the viewpoints of enhancing the impact absorbency and the draping property of the obtained molded product, aramid fibers can be preferably used. From the viewpoint of enhancing the conductivity of the obtained molded body, a reinforcing fiber coated with a metal such as nickel, copper, or ytterbium can also be used.

The reinforcing fiber strand may include, for example, a reinforcing fiber mixed with an organic fiber, an organic compound, or an inorganic compound, or a reinforcing fiber to which a sizing material is adhered.

The dry tape material may be a reinforcing fiber strand itself or may include a plurality of reinforcing fiber strands.

It is important that the reinforcing fiber strand has thicknesses T1 (μm) and T3 (μm) at both ends in a width direction of a section of the reinforcing fiber strand, and both T1 and T3 are within a range of 50 to 200% relative to a thickness T2 (μm) at a central portion of the reinforcing fiber strand. With such a configuration, when the dry tape material is placed by a method of fiber placement to obtain a reinforcing fiber substrate, the impregnation property with a resin is good and a high productivity can be achieved. The obtained molded body has a high mechanical strength. Furthermore, by using the dry tape material, productivity and the mechanical properties of the FRP can be improved, and in addition, the types of resins to be injected and the variety of the process window can be increased.

More specifically, when T1 (μm) and T3 (μm) are 200% or less relative to T2 (μm), the change in the width of the reinforcing fiber strand can be suppressed during placing the dry tape material by the method of fiber placement. When the end of the reinforcing fiber strand is extremely thick compared to the central portion, the reinforcing fiber strand is pressed against a mold by the method of fiber placement so that the end is expanded by the pressing. Meanwhile, when T1 (μm) and T3 (μm) is 200% or less relative to T2 (μm), the expansion of the width at the end can be suppressed. By using the tape including such reinforcing fiber strands, it is possible to ensure the gap between the strands that serves as a flow path for impregnation of a resin, and it is possible to improve the productivity during impregnating a resin. The upper limit is preferably less than 175%, and more preferably less than 150%. The closer T1 (μm) and T3 (μm) are to 100% relative to T2 (μm), the more remarkable the effect is.

Meanwhile, when the thickness of the end of the reinforcing fiber strand is smaller than that of the central portion of the reinforcing fiber strand, the central portion of the reinforcing fiber strand is pressed during placing the dry tape material including the reinforcing fiber strand on a mold by the method of fiber placement so that the reinforcing fiber strand is spread in the width direction as a whole. At this time, when T1 (μm) and T3 (μm) are 50% or more relative to T2 (μm), the reinforcing fiber strand is pressed by a roller relatively over the entire width direction so that the load by the roller is not concentrated at one portion but dispersed. As a result, the expansion of the width of the reinforcing fiber strand can be suppressed. Therefore, it is important that the lower limit is 50% or more, and the lower limit is more preferably 75% or more.

It is important that the reinforcing fiber strand has a width W [mm] and a number of filaments N [unit: K] that satisfy a relationship of 4.8<N/W<12. The lower limit is preferably more than 5.8, and more preferably more than 7.8.

When N/W is more than 4.8, the width of the strand can be reduced with the constant number of filaments in the reinforcing fiber strand. That is, making N/W more than 4.8 means using a reinforcing fiber strand having a width less than the constant N/4.8 when the number of filaments in the reinforcing fiber strand is considered to be constant. Therefore, the dry tape material including the reinforcing fiber strands can have gaps finely placed between a plurality of adjacent reinforcing fiber strands. As a result, when the dry tape material is arranged in one direction by the method of fiber placement, the gap existing between the plurality of reinforcing fiber strands can be ensured as a flow path for a matrix resin, and a matrix resin can easily flow during the molding. Meanwhile, when the reinforcing fiber strand has a constant width of the strand, the number of filaments N can be increased. That is, making N/W more than 4.8 means using a reinforcing fiber strand having a number of filaments N that is more than the constant 4.8 W. Therefore, when the dry tape material including the reinforcing fiber strand is arranged in one direction by the method of fiber placement, the fabric weight per layer of the obtained substrate can be increased, the time required for stacking the substrates can be shortened, and the productivity can be improved.

The larger the value of N/W is, the more remarkable the effect is. However, when the value of N/W is too large and when the number of filaments in the reinforcing fiber strand is constant, there is a problem that the width of the strand is too small so that the time required for placing the reinforcing fiber strand is significantly increased. Furthermore, when the reinforcing fiber strand has a constant width of the strand, there is a possibility that the number of filaments N is increased too much so that the thickness of the substrate is difficult to control and a matrix resin is difficult to impregnate into the reinforcing fiber strand. From the above viewpoints, it is important that the upper limit of N/W is 12, and the upper limit is preferably less than 10, and more preferably less than 8.

Furthermore, it is important that the first resin material that keeps the form of the reinforcing fiber strand and is heat-meltable, and has a glass transition temperature Tg (° C.) or a melting point Tm (° C.) of 40° C. or more and 200° C. or less. When the heat-meltable first resin material has both a glass transition temperature Tg (° C.) and a melting point Tm (° C.) like, for example, a crystalline polymer, it is important that the melting point Tm (° C.) is 40° C. or more and 200° C. or less. Such a first resin material fixes the filaments included in the reinforcing fiber strand to each other in a state where, after the viscosity is reduced by heating, the temperature is returned to room temperature by cooling or the like, and the reliability of keeping a certain form as a reinforcing fiber strand is increased.

Next, the tape material will be described more specifically with reference to the drawings.

Figure 1B:
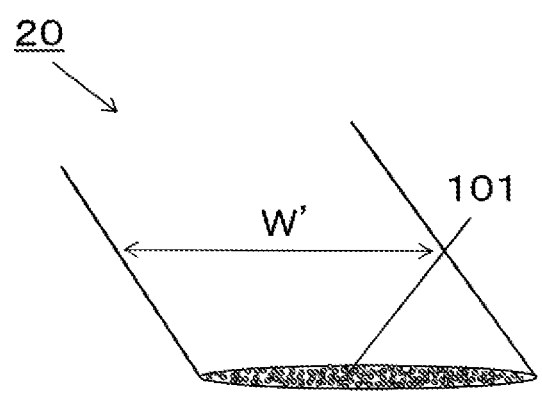

FIGS. 1(a) and 1(b) shows schematic views of a reinforcing fiber strand included in the tape material and a reinforcing fiber filament assembly being a precursor of the reinforcing fiber strand. The number of filaments in a reinforcing fiber strand 10 is the number of the reinforcing fiber filaments (single yarns) 101 included in the reinforcing fiber strand 10. The reinforcing fiber strand 10 is produced by adjusting the width and the thickness of a reinforcing fiber filament assembly 20 as a precursor and keeping the adjusted form with the first resin material. In the reinforcing fiber filament assembly 20, the reinforcing fiber filaments 101 are bundled by a bundling material such as a sizing material. However, the shape is not completely fixed, and the form is sometimes changed during releasing the tension.

As shown in FIGS. 1(a) and 1(b), when a direction on the same plane as the running direction of the reinforcing fiber strand and perpendicular to the running direction (a direction of two directions perpendicular to the longitudinal direction of the reinforcing fiber strand, in which the reinforcing fiber strand is wider) is regarded as the strand width direction, the thicknesses T1 (μm) and T3 (μm) of the end of the reinforcing fiber strand is the thickness of the portion inward by 1 mm from each end of the section in the strand width direction. The thickness T2 of the central portion of the strand refers to the thickness of the central portion of the section in the strand width direction, that is, the portion at the same distance from the left and the right ends.

The thicknesses T1 (μm), T2 (μm), and T3 (μm) of the reinforcing fiber strand 10 are measured as follows. The form of the reinforcing fiber strand is retained by applying a room temperature curable resin and impregnating and curing the resin in a state where the reinforcing fiber strand is drawn out of a bobbin with a constant tension in the range of 200 to 3,000 cN. The obtained sample is fixed by the resin, and the section is observed to measure the thickness of the reinforcing fiber strand at the ends and the central portion.

The number of filaments in the reinforcing fiber strand 10 is measured as follows. The reinforcing fiber strand 10 to be measured is impregnated and cured with an epoxy resin. Then, the cured reinforcing fiber strand 10 is cut in the direction perpendicular to the longitudinal direction so that the section can be identified, and the section is polished and observed with a digital microscope (for example, VHX-1000 manufactured by KEYENCE CORPORATION). The obtained image is binarized, sections of the reinforcing fiber filaments included in the reinforcing fiber strand 10 are each extracted and counted, and the counted number is defined as the number of filaments.

The width of the reinforcing fiber strand 10 is measured as follows. Using an ultra-high-speed and high-accuracy dimension measuring instrument (for example, LS-9500 manufactured by KEYENCE CORPORATION), the width of the strand is measured while the reinforcing fiber strand 10 is unwound by 10 m at a constant tension in the range of 200 to 3,000 cN and a constant speed of 2.5 m/min. The width of the strand refers to the outer dimension of the reinforcing fiber strand 10 (maximum distance from one end to the other end) on the same plane as the running direction of the reinforcing fiber strand 10 and perpendicular to the running direction. The width of the strand is measured every one second, and the average of the obtained data values is determined as the width of the reinforcing fiber strand.

In measuring the thickness, the number of filaments, and the width of the reinforcing fiber strand from the dry tape material, only one reinforcing fiber strand 10 is taken out from the dry tape material, and the form of the reinforcing fiber strand 10 is retained by impregnating and curing a room temperature curable resin in a state where a constant tension of 200 to 3,000 cN is applied. After that, the obtained sample is fixed by the resin, the section is observed and, then, the measurement can be performed in the same manner as described above. When the dry tape material includes a plurality of reinforcing fiber strands 10, only one reinforcing fiber strand 10 is taken out so as a gap provided between the reinforcing fiber strands 10 is a boundary.

The width W of the reinforcing fiber strand 10 is preferably less than 30 mm, more preferably less than 10 mm, and still more preferably less than 5 mm. When the width of the reinforcing fiber strand 10 is 30 mm or more, the gap interval formed between the reinforcing fiber strands 10 that are placed in parallel by the method of fiber placement is increased between the gaps so that the flow paths for a matrix resin are not finely placed. Therefore, a matrix resin is hardly impregnated into the reinforcing fiber strand 10 in the thickness direction during the molding so that there is a concern that the productivity will be deteriorated. Furthermore, the matrix resin needs a long time to flow, the viscosity of the matrix resin is increased although the viscosity is important for the injection molding of the matrix resin, and an unimpregnated portion is easily generated so that there is also a concern that the mechanical property of the molded product will be significantly deteriorated. When the width of the reinforcing fiber strand 10 is less than 30 mm, the reinforcing fiber strands 10 can be placed in a state where the gap interval formed between the reinforcing fiber strands 10 is narrowed and the number of the gaps is increased so that a desired flow path for a matrix resin can be ensured and the number of the placed reinforcing fiber strands 10 can be increased. When the width of the reinforcing fiber strand 10 is less than 10 mm, the number of the placed flow path for a matrix resin can be further increased, and when the width is less than 5 mm, the number of the placed flow path can be still further increased so that it is possible to realize a high productivity during the molding and to improve the mechanical property and the like of the molded product.

The number of filaments N (unit: K=1,000) in the reinforcing fiber strand 10 is preferably 60 K (60,000) or less. When the number of the single fibers in the reinforcing fiber strand 10 is more than 60 K, the fiber areal weight of the reinforcing fiber strand 10 is high, and when the reinforcing fiber strands 10 are aligned by the method of fiber placement to obtain a substrate, the carbon fiber areal weight per layer is too high so that there is a possibility that the allowable range of the design of the fiber orientation will be narrowed.

The width W of the reinforcing fiber strand 10 is preferably smaller than the width W' of the reinforcing fiber filament assembly 20. When the width W of the reinforcing fiber strand 10 is smaller than the width W' of the reinforcing fiber filament assembly 20, when the dry tape material is placed by the method of fiber placement to obtain a substrate, the gaps provided between the adjacent reinforcing fiber strands 10 can be resultingly placed at a fine interval so that the gap between the reinforcing fiber strands 10 can be sufficiently ensured as a flow path for a resin.

Furthermore, the number of filaments in the reinforcing fiber strand 10 and the number of filaments in the reinforcing fiber filament assembly 20 are preferably substantially equal. By avoiding slitting the reinforcing fiber filament assembly 20 to adjust the number of filaments to a predetermined number, it is possible to reduce the number of times of placing the reinforcing fiber strands 10 during aligning the reinforcing fiber strands 10 in the method of fiber placement to obtain a substrate, and the productivity can be improved.

Figure 2A:
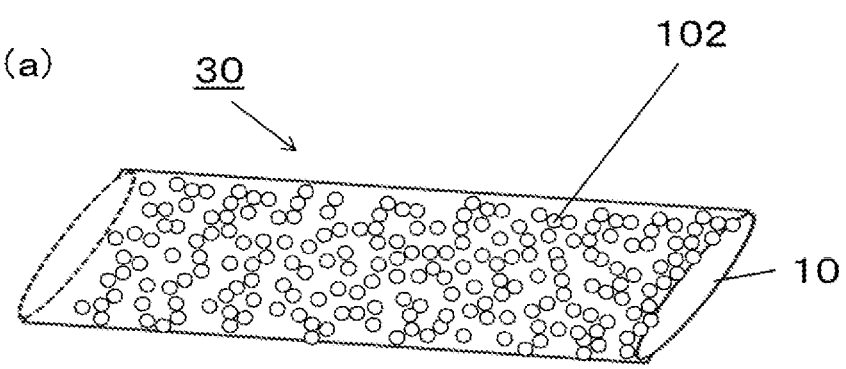
FIGS. 2(a) and 2(b) are schematic views of carbon fiber tape materials according to one example showing a state in which a reinforcing fiber strand has a form kept by a first resin material.
Figure 2B:
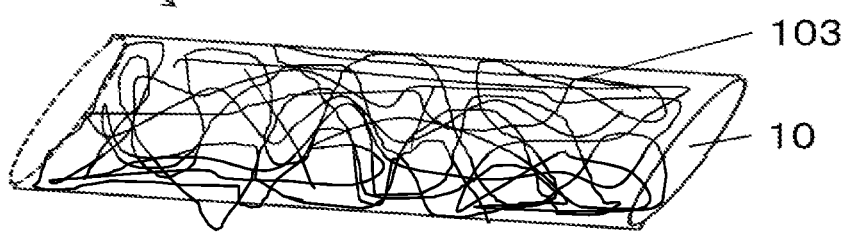

Next, FIGS. 2(a) and 2(b) show schematic views of a carbon fiber tape material according to one example (views showing a state in which the reinforcing fiber strand has a form kept by application of the first resin material).

The heat-meltable first resin material used for keeping the form of the reinforcing fiber strand 10 may have a shape like a particle 102 as shown in FIG. 2(a) or a shape of a nonwoven fabric 103 as shown in FIG. 2(b) as long as the first resin material can fix the filaments included in the reinforcing fiber strand 10 to each other and keep a certain form as a reinforcing fiber strand. The first resin material is not limited to those having a shape described above, and may be a film, a mesh, an emulsion, a coating, or an auxiliary yarn wound around a bundle of a reinforcing fiber strand.

As the material of the first resin material, a thermoplastic resin such as a polyamide resin, a polyester resin, a polyethylene terephthalate resin, a polyvinyl formal resin, a polyether sulfone resin, a phenoxy resin, or a polycarbonate resin, a phenol-based resin, a phenoxy resin, an epoxy resin, a polystyrene-based resin, a polyolefin-based resin, a polyurethane-based resin, a polyester-based resin, a polyamide-based resin, a polybutadiene-based resin, a polyisoprene-based resin, a fluorine-based resin, a thermoplastic elastomer such as an acrylonitrile-based thermoplastic elastomer or the like, a copolymer or a modified product thereof, a resin produced by blending two or more of these resins or the like can be used.

These heat-meltable first resin materials can be used to obtain the adhesive function of sticking the layers to one another when the reinforcing fiber laminate is formed. Furthermore, the first resin material can be used for the purpose of ensuring a flow path for a matrix resin during the impregnation, and for the purpose of strengthening the interval between the layers by using a resin including a material exhibiting high toughness.

As the form of fixing the reinforcing fiber strand 10, the first resin material may be adhered to and partially impregnated into the reinforcing fiber strand 10 in a state of being visible on the surface of the reinforcing fiber strand 10 and bind a plurality of reinforcing fiber filaments included in the reinforcing fiber strand, or may be impregnated into the inside of the reinforcing fiber strand 10 in a state of being invisible on the surface and bind a plurality of reinforcing fiber filaments included in the reinforcing fiber strand. Alternatively, the first resin material can be wound around or coats on the reinforcing fiber strand 10.

The amount of the first resin material required to fix the reinforcing fiber strand 10 is preferably 25% by weight or less, more preferably 20% by weight or less, and still more preferably 15% by weight or less based on the weight of the reinforcing fiber strands 10. When the amount of the first resin material is more than 25% by weight, the fluidity of the matrix resin and the productivity are deteriorated during arranging and stacking the dry tape materials by the method of fiber placement to obtain a reinforcing fiber laminate and molding the reinforcing fiber laminate; in addition, the matrix resin needs a long time to flow so that the viscosity of the matrix resin is increased although the viscosity is important for the injection molding of the matrix resin, an unimpregnated portion is generated, and the mechanical property of the molded product is significantly deteriorated.

Figure 3A:
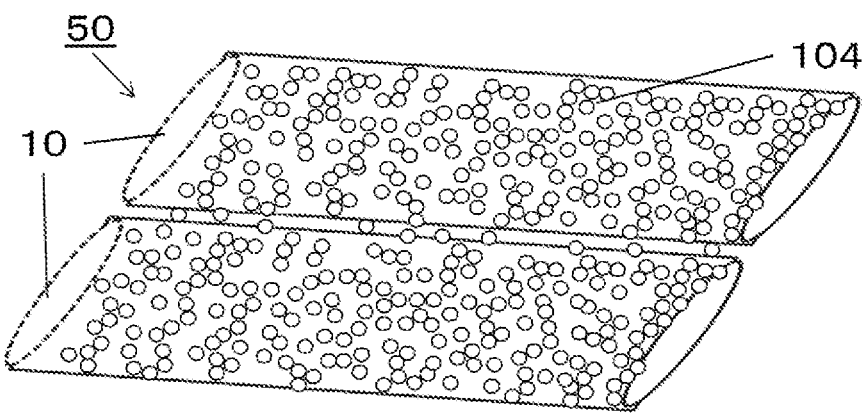
FIGS. 3(a) and 3(b) are schematic views of carbon fiber tape materials according to one example.
Figure 3B:
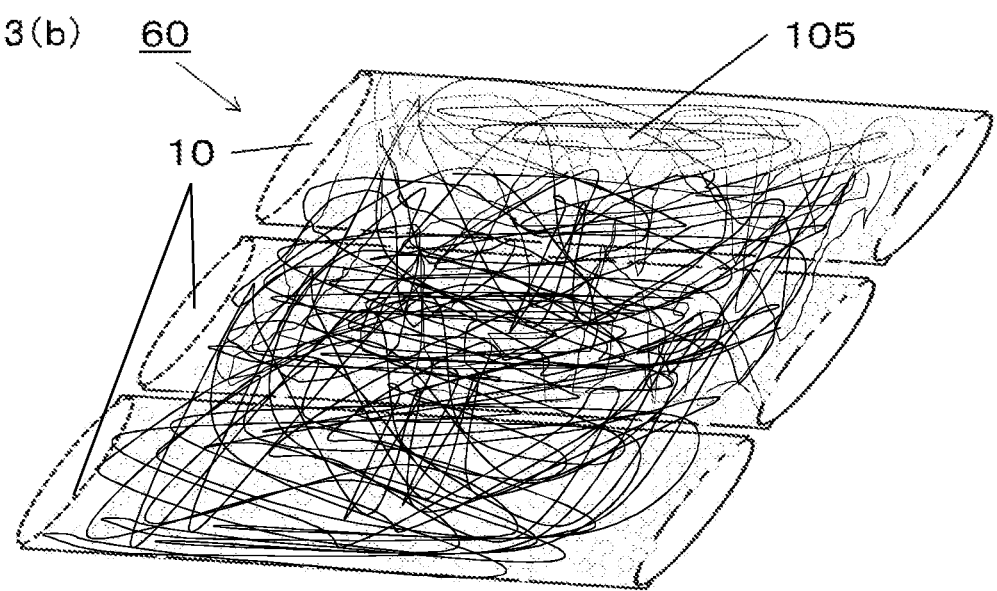

Next, FIGS. 3(a) and 3(b) show schematic views in which a plurality of reinforcing fiber strands 10 are aligned to obtain a dry tape material.

In dry tape materials 50 and 60, a plurality of reinforcing fiber strands 10 are bound and integrated with each other by the second resin material. The reinforcing fiber strands 10 are preferably placed in parallel to each other (in parallel rows) in the width direction of the reinforcing fiber strand 10. Furthermore, it is preferable that there be a gap between the plurality of reinforcing fiber strands 10 included in the dry tape material.

Since the dry tape material includes the plurality of reinforcing fiber strands 10 and they are integrated with each other, the number and the weight of reinforcing fiber filaments per unit length of the dry tape material are increased, the time required to align the reinforcing fiber strands 10 by the method of fiber placement to obtain a substrate is shortened, and productivity can be improved. Furthermore, since there is a gap between the plurality of reinforcing fiber strands 10 included in the dry tape material, when the dry tape material is arranged in one direction by the method of fiber placement to obtain a substrate, a flow path for a matrix resin can be ensured. Also, when the dry tape material is arranged in one direction without any gap by the method of fiber placement to obtain a substrate, since there is a gap provided between the plurality of reinforcing fiber strands 10 fixed in the dry tape material, the fluidity of a matrix resin can be ensured during the molding.

As the material of the second resin material, a thermoplastic resin such as a polyamide resin, a polyester resin, a polyethylene terephthalate resin, a polyvinyl formal resin, a polyether sulfone resin, a phenoxy resin, or a polycarbonate resin, a phenol-based resin, a phenoxy resin, an epoxy resin, a polystyrene-based resin, a polyolefin-based resin, a polyurethane-based resin, a polyester-based resin, a polyamide-based resin, a polybutadiene-based resin, a polyisoprene-based resin, a fluorine-based resin, a thermoplastic elastomer such as an acrylonitrile-based thermoplastic elastomer or the like, a copolymer or a modified product thereof, a resin produced by blending two or more of these resins or the like can be used.

The heat-meltable second resin material can be used to obtain the adhesive function of sticking the layers to one another when the reinforcing fiber laminate is formed. Furthermore, the second resin material can be used for the purpose of ensuring a flow path for a matrix resin during the impregnation, and for the purpose of strengthening the interval between the layers by using a resin including a material exhibiting high toughness.

The second resin material that integrates a plurality of reinforcing fiber strands 10 with each other may have a shape like a particle 104 as shown in FIG. 3(a) or a shape like a nonwoven fabric 105 as shown in FIG. 3(b) as long as the second resin material can bind and integrate reinforcing fiber strands. The second resin material is not limited to those having a shape described above, and may be a film, a mesh, an emulsion, a coating, or an auxiliary yarn wound around a reinforcing fiber strand.

When the second resin material has a material and a form different from those of the first resin material, the second resin material itself is not required to keep the form of the strand, and is required to straddle and adhere to the plurality of reinforcing fiber strands 10 so that they are not separated. For example, it is required that the resin material having a particle shape straddle both ends of the plurality of strands and adhere to the strands through the melt of the resin material.

Meanwhile, the second resin material may have the same material and the same form as the first resin material. For example, the resin materials preferably satisfy both the function of fixing and keeping the shape of the reinforcing fiber strand 10 and the function of binding the plurality of reinforcing fiber strands 10 to each other. Such a method may be the one in which the first and the second resin materials having a shape of a nonwoven fabric fix each reinforcing fiber strand 10 while the first and the second resin materials straddle and adhere to the surfaces of the plurality of reinforcing fiber strands 10, or may be the one in which the resin materials having a particle shape is melted so that the resin materials straddle and adhere to both the surfaces and both the ends of the plurality of strands while the resin materials fix each reinforcing fiber strand 10.

Figure 4:
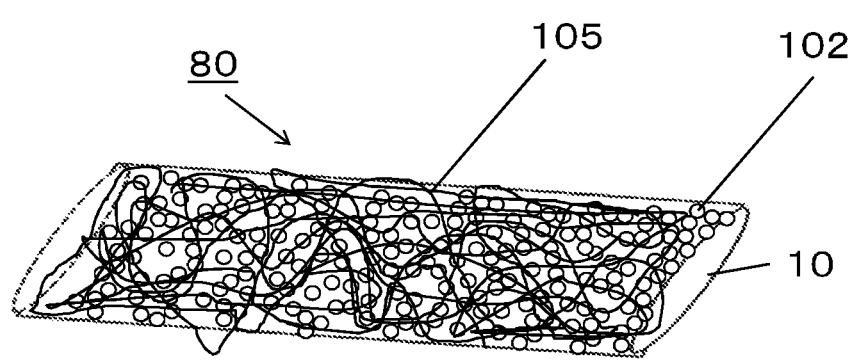
FIG. 4 is a schematic view of a carbon fiber tape material according to one example.

When the dry tape material includes one reinforcing fiber strand, the second resin material binds and integrates the reinforcing fiber strand itself. For example, as shown in FIG. 4, it is required that the reinforcing fiber strand 10 in which the filaments are fixed to each other by the first resin material having a shape like the particle 102 is further covered with the second resin material like the nonwoven fabric 105 to obtain a dry tape material 80.

Figure 5:
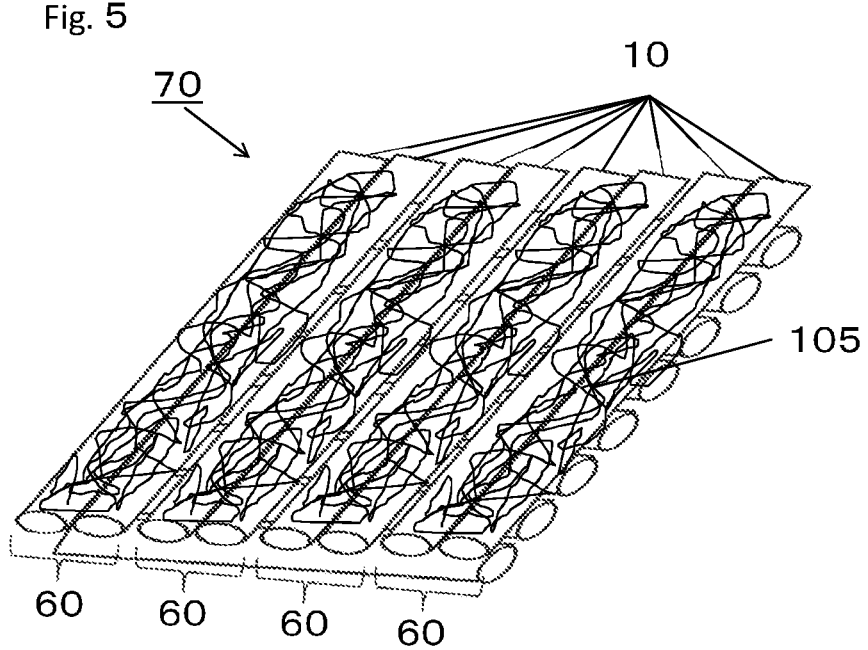
FIG. 5 is a schematic view of a reinforcing fiber sheet (reinforcing fiber laminate) including a carbon fiber tape material, according to one example.

Next, FIG. 5 shows a schematic view of a reinforcing fiber laminate in which the dry tape material is used.

A reinforcing fiber laminate 70 has a shape kept by arranging and stacking dry tape materials 60 and sticking the layers to one another. With such a configuration, it is possible to set and place the reinforcing fiber strands 10 with the gap between the reinforcing fiber strands 10 included in the reinforcing fiber laminate 70 at any distance. As a result, the fluidity of a matrix resin during the molding can be sufficiently ensured, and productivity is improved.

Furthermore, it is preferable that the reinforcing fiber laminate 70 in which the dry tape material is used be impregnated with a matrix resin and cured to obtain a fiber-reinforced plastic molded body. With the above-described configuration, the fiber-reinforced plastic molded body can be completely impregnated with the resin to the inside and can have a high mechanical property.

The dry tape material for fiber placement as described above is produced by binding and integrating a plurality of reinforcing fiber strands produced by (i) and (ii) below in order with each other by the second resin material.

Figure 6:
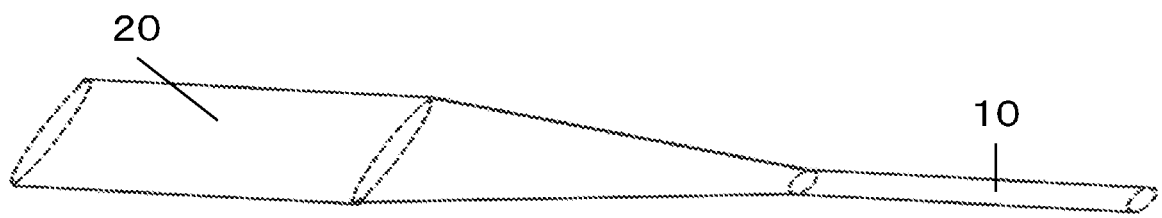
FIG. 6 is a schematic view that shows one process in a method of manufacturing a dry tape material according to one example.

(i) Adjusting a thickness of a section of the reinforcing fiber strand so that the reinforcing fiber strand has thicknesses T1 (μm) and T3 (μm) at both ends in a width direction of the section, and both T1 and T3 are within a range of 50 to 200% relative to a thickness T2 (μm) at a central portion in the width direction, and adjusting a width of the section so that the reinforcing fiber strand has a number of filaments N [unit: K] and a width W [mm] that satisfy a relationship of $4.8<N/W<12$ (ii) Placing a first resin material on a surface of the reinforcing fiber strand, the first resin material having a glass transition temperature Tg or a melting point Tm of 40° C. or more and 200° C. or less and being heat-meltable, and heating and cooling the first resin material to obtain the reinforcing fiber strand FIG. 6 shows one process in a method of manufacturing a dry tape material according to one example.

The reinforcing fiber strand 10 is produced by narrowing the width and the thickness of the reinforcing fiber filament assembly 20 without slitting, and then fixing the shape by the heat-meltable first resin material. At this time, it is required that (i) and (ii) above be satisfied. By passing the reinforcing fiber filament assembly 20 through the process of narrowing the width and the thickness, the width W and the thickness can be changed without substantial change in the number of filaments N in the reinforcing fiber filament assembly 20. As the result, the number of filaments with respect to the width (N/W) can be relatively increased, in other words, the width of the strand with respect to the number of filaments can be relatively decreased. Therefore, it is possible to manufacture the dry tape material in which a large number of gaps that serve as flow paths for a matrix resin can be ensured between the plurality of reinforcing fiber strands 10.

As a method of narrowing the width and the thickness of the reinforcing fiber strand 10, a method in which the reinforcing fiber filament assembly 20 is passed through a guide roller that makes the width narrower than the width before the drawing, a method in which the reinforcing fiber filament assembly 20 is passed through a die having a predetermined thickness and width, or a method in which the width is narrowed and the thickness is adjusted by combining the above-described methods in multiple stages can be applied. Furthermore, it is possible to narrow the width and adjust the thickness while the reinforcing fiber filament assembly 20 is heated to reduce the viscosity of the bundling material adhered to the surface of the reinforcing fiber filament assembly 20. It is also possible to narrow the width and adjust the thickness while the reinforcing fiber filament assembly 20 is passed through a resin bath (resin tank) containing a bundling material.

The reinforcing fiber strand 10 in which the thickness and the width are adjusted as described above has a shape fixed by the heat-meltable first resin material. As a result, during producing a substrate from the dry tape material, the degree of freedom in placing the reinforcing fiber strand 10 is increased, and the gap between the reinforcing fiber strands 10 can be ensured. That is, since the shape of the reinforcing fiber strand 10 is hardly changed, the reinforcing fiber strands 10 can be placed at a desired interval.

By using the method of fiber placement, substrates in which the dry tape materials are placed in parallel are formed, the substrates are stacked without weaving, and the layers of the substrates are adhered to one another to produce a reinforcing fiber laminate.

EXAMPLES

Our dry tape material will be described based on Examples.

Example 1

Reinforcing Fiber Filament Assembly

As a reinforcing fiber filament assembly, a previously sized carbon fiber "TORAYCA" (registered trademark) T800SC manufactured by Toray Industries, Inc. and having 24,000 carbon fiber filaments (N=24 K) was used.

Dry Tape Material

Using a carbon fiber strand manufacturing apparatus (not shown), a carbon fiber filament assembly having a width of W'=8 mm and a number of filaments of N [K]=24 (N/W=3) was drawn out in parallel to obtain a carbon fiber strand (10) in which the width was narrowed without slitting while the thickness was adjusted (the ratios of the thicknesses of the ends to the thickness of the central portion were T1/T2=111 and T3/T2=142). Then, heat-meltable resin particles having a softening point temperature of 80° C. (average particle size: 0.2 mm) were dispersed on the surface of the carbon fiber filament assembly, melted, and cooled to obtain a carbon fiber strand having a fixed form.

Three carbon fiber strands were aligned in parallel in the width direction so that a gap of 0.2 mm was provided between the carbon fiber strands, then a nonwoven fabric (material: polyamide) having a softening point temperature of 180° C. was placed on the surfaces of the three carbon fiber strands, the resulting product was heated, and the three carbon fiber strands were bound and integrated with each other to obtain a dry tape material.

Laminate Sheet Substrate

Using a fiber placement device (not shown), the dry tape materials were aligned and placed on a pedestal in one direction so that a gap of 0.2 mm was provided between the tapes, the placement was repeated to produce substrates while the dry tape materials were cut so that the resulting product had a square shape of 1000 mm×1000 mm, the substrates were laminated so that the directions of the fiber orientation of the carbon fiber bundle included in each substrate were orthogonal to each other, and respective layers were adhered to one another to produce a laminate sheet substrate.

Reinforcing Fiber Laminate

A plurality of the laminate sheet substrates were stacked so that the areal weight of the reinforcing fiber laminate was 2.4 kg/m', placed on a flat mold, then enclosed with a bag film and a sealant, depressurized to a vacuum and, in that state, heated in an oven at 80° C. for 1 hour. Then, the resulting product was taken out from the oven, the mold of the reinforcing fiber laminate was cooled to room temperature, and then the pressure released to obtain a reinforcing fiber laminate.

Example 2

A reinforcing fiber laminate was obtained in the same procedure as in Example 1 except that the thickness was adjusted and a strand in which the ratios of the thicknesses of the reinforcing fiber strand were T1/T2=127 and T3/T2=170 was used as the dry tape material.

Example 3

A reinforcing fiber laminate was obtained in the same procedure as in Example 1 except that a strand in which the ratios of the thicknesses of the reinforcing fiber strand were T1/T2=164 and T3/T2=121 was used as the dry tape material.

Comparative Example 1

A reinforcing fiber laminate was obtained in the same procedure as in Example 1 except that a strand in which the ratios of the thicknesses of the reinforcing fiber strand were T1/T2=294 and T3/T2=124 was used as the dry tape material.

Example 4

Reinforcing Fiber Filament Assembly

As a reinforcing fiber filament assembly, a previously sized carbon fiber "TORAYCA" (registered trademark) T800SC manufactured by Toray Industries, Inc. and having 24,000 carbon fiber filaments (N=24 K) was used.
Dry Tape Material Using a carbon fiber strand manufacturing apparatus (not shown), a carbon fiber filament assembly having a width of W'=8 mm and a number of filaments of N [K]=24 (N/W=3) was drawn out in parallel, and the width W was narrowed to 4 mm (N/W=6) without slitting. Then, heat-meltable resin particles having a softening point temperature of 80° C. (average particle size: 0.2 mm) were dispersed on the surface of the carbon fiber filament assembly, melted, and cooled to obtain a carbon fiber strand having a width W of 4 mm (N/W=6) and a fixed form (T1/T2=95, T3/T2=110). Three of the obtained strands were used as a dry tape material and, then, a reinforcing fiber laminate was obtained in the same procedure as in Example 1.

Example 5

A reinforcing fiber laminate was obtained in the same procedure as in Example 4 except that a strand in which the width of the reinforcing fiber strand is 4 mm (N/W=6), T1/T2=113, and T3/T2=109 was used as the dry tape material.

Example 6

Two reinforcing fiber strands obtained in the same procedure as in Example 4 except that the width was 4.8 mm (N/W=5), T1/T2=84, and T3/T2=87 were aligned in parallel without a gap and placed to obtain a dry tape material in the same procedure as in Example 4. Using the dry tape material, a reinforcing fiber laminate was obtained in the same procedure as in Example 1.

Example 7

Using a carbon fiber strand manufacturing apparatus (not shown), two carbon fiber filament assemblies having a width of W'=8 mm and a number of filaments of N [K]=24 (N/W=3) each were drawn out in parallel to be stacked, and passed through a heating die having a predetermined thickness and width, and the width W was narrowed to 5 mm (N/W=9.6) in a state where the two carbon fiber filament assemblies were integrated. Then, heat-meltable resin particles having a softening point temperature of 80° C. (average particle size: 0.2 mm) were dispersed on the surface of the carbon fiber filament assembly, melted, and cooled to obtain a carbon fiber strand having a width W of 5 mm (N/W=9.6) and a fixed form (T1/T2=89, T3/T2=80). Two of the obtained strands were used as a dry tape material, and a reinforcing fiber laminate was obtained in the same procedure as in Example 1.

Comparative Example 2

A reinforcing fiber laminate was obtained in the same procedure as in Example 1 except that one reinforcing fiber strand obtained in the same procedure as in Example 4 was used as the dry tape material without narrowing the width of the reinforcing fiber filament assembly having a width of 8 mm.

Comparative Example 3

Two reinforcing fiber strands obtained in the same procedure as in Example 4 except that the width was 5 mm (N/W=4.8) were aligned in parallel in the width direction so that a gap of 0.2 mm was provided between the carbon fiber strands, and then a dry tape material was obtained in the same procedure as in Example 4. Using the dry tape material, a reinforcing fiber laminate was obtained in the same procedure as in Example 4.

Comparative Example 4

Using a carbon fiber strand manufacturing apparatus (not shown), a carbon fiber filament assembly having a width of W'=8 mm and a number of filaments of N [K]=24 (N/W=3) was drawn out in parallel, and passed through a heating die having a predetermined thickness and width, and the width W was narrowed to 1.8 mm (N/W=13.3). Then, heat-meltable resin particles having a softening point temperature of 80° C. (average particle size: 0.2 mm) were dispersed on the surface of the carbon fiber filament assembly, melted, and cooled. However, an obtained carbon fiber strand had a form that was not fixed and an increased width of 2.1 mm so that a desired carbon fiber strand was not obtained.
Evaluation The reinforcing fiber laminate produced in each of the Examples and Comparative Examples was subjected to a resin impregnation test in the out-of-plane direction (thickness direction) using an impregnation test device (not shown). Table 1 shows the impregnation coefficient Kz of the reinforcing fiber laminate in the out-of-plane direction obtained in Examples 1 to 3 and Comparative Example 1 based on the value in Comparative Example 1 of 1. Furthermore, Table 2 shows the impregnation coefficient Kz of the reinforcing fiber laminate in the out-of-plane direction obtained in Examples 4 to 7 and Comparative Examples 2 and 3 based on the value in Comparative Example 2 of 1.

The impregnation coefficient Kz is used in Darcy's law expressed by the following equation, and is an index of the impregnation property of a fiber substrate.

$$V = Kz \nabla P/i \quad (1)$$

V: Impregnation speed of fluid
Kz: Impregnation coefficient
∇P: Pressure gradient
i: Viscosity of fluid

Example 1

As a result of the impregnation test for the reinforcing fiber laminate in which the dry tape material was used, the dry tape material having the gap of 0.2 mm between the three strands in which the thickness of the reinforcing fiber strand was adjusted and the ratios of the thicknesses were T1/T2=111 and T3/T2=142, the impregnation property was obtained that was so excellent that the reinforcing fiber laminate was not unimpregnated during the molding, and the impregnation coefficient Kz was enhanced to 6 times of that in Comparative Example 1 in which the ratios of the thicknesses of the reinforcing fiber strand were T1/T2=294 and T3/T2=124.

Example 2

As a result of the impregnation test for the reinforcing fiber laminate in which the dry tape material was used, the dry tape material having the gap of 0.2 mm between the three strands in which the thickness of the reinforcing fiber strand was adjusted and the ratios of the thicknesses were T1/T2=127 and T3/T2=170, the impregnation property was obtained that was so good that the reinforcing fiber laminate was not unimpregnated during the molding, and the impregnation coefficient Kz was enhanced to 3 times of that in Comparative Example 1 in which the ratios of the thicknesses of the reinforcing fiber strand were T1/T2=294 and T3/T2=124.

Example 3

As a result of the impregnation test for the reinforcing fiber laminate in which the dry tape material was used, the dry tape material having the gap of 0.2 mm between the three strands in which the thickness of the reinforcing fiber strand was adjusted and the ratios of the thicknesses were T1/T2=164 and T3/T2=121, the impregnation property was obtained that was so good that the reinforcing fiber laminate was not unimpregnated during the molding, and the impregnation coefficient Kz was enhanced to 2 times of that in Comparative Example 1 in which the ratios of the thicknesses of the reinforcing fiber strand were T1/T2=294 and T3/T2=124.

Comparative Example 1

As a result of the impregnation test for the reinforcing fiber laminate in which the dry tape material was used, the dry tape material having the gap of 0.2 mm between the three strands in which the thickness of the reinforcing fiber strand was adjusted and the ratios of the thicknesses were T1/T2=294 and T3/T2=124, the impregnation property was so low that there was a possibility that the reinforcing fiber laminate was unimpregnated during the molding.

Example 4

As a result of the impregnation test for the reinforcing fiber laminate in which the dry tape material was used, the dry tape material having the gap of 0.2 mm between the three strands in which the width W of the reinforcing fiber strand was narrowed to 4 mm (N/W=6), the impregnation property was obtained that was so excellent that the reinforcing fiber laminate was not unimpregnated during the molding, and the impregnation coefficient Kz was enhanced to 6 times of that in Comparative Example 2 in which the reinforcing fiber strand was not narrowed and N/W was 3. Furthermore, in Example 4, since the number of strands per dry tape material was three, it was possible to produce the reinforcing fiber laminate with 0.3 times of the number of times of placing based on that in Comparative Example 2 in which the number of strands per dry tape material was one, and it was possible to shorten the time required for the stacking.

Example 5

As a result of the impregnation test for the reinforcing fiber laminate in which the dry tape material was used, the dry tape material having one strand in which the width W of the reinforcing fiber strand was narrowed to 4 mm (N/W=6), the impregnation property was obtained that was so excellent that the reinforcing fiber laminate was not unimpregnated during the molding, and the impregnation coefficient Kz was enhanced to 6 times of that in Comparative Example 2 in which the reinforcing fiber strand was not narrowed and N/W was 3.

Example 6

As a result of the impregnation test for the reinforcing fiber laminate in which the dry tape material was used, the dry tape material having two strands aligned with no gap, in which the width W of the reinforcing fiber strand was narrowed to 4.8 mm (N/W=5), the impregnation property was obtained that was so good that the reinforcing fiber laminate was not unimpregnated during the molding, and the impregnation coefficient Kz was enhanced to 2 times of that in Comparative Example 2 in which the reinforcing fiber strand was not narrowed and N/W was 3. Furthermore, when the dry tape material described in Example 6 was used, the number of times of placing the dry tape material required for producing the reinforcing fiber laminate was 0.5 times of that in Comparative Example 2, and it was possible to shorten the time required for the stacking.

Example 7

As a result of the impregnation test for the reinforcing fiber laminate in which the dry tape material was used, the dry tape material having the gap of 0.2 mm between the two strands in which the width W of the reinforcing fiber strand was narrowed to 5 mm (N/W=9.6), the impregnation property was obtained that was so excellent that the reinforcing fiber laminate was not unimpregnated during the molding, and the impregnation coefficient Kz was enhanced to 4 times of that in Comparative Example 2 in which the reinforcing fiber strand was not narrowed and N/W was 3.

Comparative Example 2

As a result of the impregnation test for the reinforcing fiber laminate in which the dry tape material was used, the dry tape material having a strand having a width W of 8 mm (N/W=3), the impregnation property was so low that there was a possibility that the reinforcing fiber laminate was unimpregnated during the molding.

Comparative Example 3

For the reinforcing fiber laminate in which the dry tape material was used, the dry tape material having the gap of 0.2 mm between the two strands having a width W of 5 mm (N/W=4.8), the impregnation property was so low that there was a possibility that the reinforcing fiber laminate was unimpregnated during the molding.

section of the reinforcing fiber strand, and both T1 and T3 are 50 to 200% relative to a thickness T2 (μm) at a central portion of the reinforcing fiber strand;
(ii) the reinforcing fiber strands have a number of filaments N [unit: K] and a width W [mm] that satisfy a relationship of 4.8<N/W<12; and
(iii) filaments comprising the reinforcing fiber strands have a form fixed by a first resin material that has a glass transition temperature Tg or a melting point Tm of 40° C. or more and 200° C. or less, the first resin material being heat-meltable,
wherein the plurality of reinforcing fiber strands are 1) bound and integrated with each other by a second resin material, and 2) kept in a relative positional relationship between one another.

2. The dry tape material according to claim 1, wherein the reinforcing fiber strands have a gap between an adjacent

TABLE 1

|  | Thickness T1 of end of reinforcing fiber strand included in dry tape material [μm] | Thickness T2 of central portion of reinforcing fiber strand included in dry tape material [μm] | Thickness T3 of end of reinforcing fiber strand included in dry tape material [μm] | T1/T2 × 100 [%] | T3/T2 × 100 [%] | Ratio of impregnation coefficient Kz (Kz = 1 in Comparative Example 1) |
|---|---|---|---|---|---|---|
| Example 1 | 147 | 132 | 188 | 111 | 142 | 6 |
| Example 2 | 180 | 142 | 241 | 127 | 170 | 3 |
| Example 3 | 307 | 187 | 226 | 164 | 121 | 2 |
| Comparative Example 1 | 359 | 122 | 151 | 294 | 124 | 1 |

TABLE 2

|  | Number of filaments [K] | Width of strand [mm] | N/W | Number of reinforcing fiber strands included in dry tape material | Gap between reinforcing fiber strands included in dry tape material [mm] | Thickness T1 of end of reinforcing fiber strand included in dry tape material [μm] | Thickness T2 of central portion of reinforcing fiber strand included in dry tape material [μm] | Thickness T3 of end of reinforcing fiber strand included in dry tape material [μm] | T1/T2 × 100 [%] | T3/T2 × 100 [%] | Ratio of impregnation coefficient Kz (Kz = 1 in Comparative Example 2) | Number of times of placing (Kz = in Comparative Example 2) |
|---|---|---|---|---|---|---|---|---|---|---|---|---|
| Example 4 | 24 | 4 | 6 | 3 | 0.2 | 303 | 319 | 352 | 95 | 110 | 6 | 0.33 |
| Example 5 | 24 | 4 | 6 | 1 | — | 332 | 293 | 320 | 113 | 109 | 6 | 1 |
| Example 6 | 24 | 4.8 | 5 | 2 | 0 | 223 | 265 | 231 | 84 | 87 | 2 | 0.5 |
| Example 7 | 48 | 5 | 9.6 | 2 | 0.2 | 459 | 518 | 412 | 89 | 80 | 4 | 0.5 |
| Comparative Example 2 | 24 | 8 | 3 | 1 | — | 171 | 139 | 131 | 123 | 94 | 1 | 1 |
| Comparative Example 3 | 24 | 5 | 4.8 | 2 | 0.2 | 348 | 162 | 211 | 215 | 130 | 1 | 0.5 |

INDUSTRIAL APPLICABILITY

Our dry tape material and the reinforcing fiber laminate in which the dry tape material is used are excellent in the impregnation property with a matrix resin so that the dry tape material and the reinforcing fiber laminate are particularly suitable for large members for aircraft, automobiles, ships and the like and members for general industrial applications such as windmill blades.

The invention claimed is:

1. A dry tape material for fiber placement, comprising a plurality of reinforcing fiber strands that satisfy (i) to (iii):
(i) the reinforcing fiber strands have thicknesses T1 (μm) and T3 (μm) at both ends in a width direction of a reinforcing fiber strand and is placed parallel to a longitudinal direction of the reinforcing fiber strand.

3. The dry tape material according to claim 1, wherein the first resin material is adhered to and partially impregnated into the reinforcing fiber strands in a state of being visible on a surface of the reinforcing fiber strands, or impregnated into an inside of the reinforcing fiber strands in a state of being invisible on the surface so that the first resin material fixes and binds a plurality of reinforcing fiber filaments included in the reinforcing fiber strands.

4. A reinforcing fiber laminate comprising the dry tape materials according to claim 1 arranged and stacked, wherein layers of the dry tape materials are stuck to one another.

5. A fiber-reinforced plastic molded body comprising:
the reinforcing fiber laminate according to claim 4; and
a matrix resin impregnated into the reinforcing fiber laminate and cured.

6. A dry tape material for fiber placement, comprising a reinforcing fiber strand that satisfies (i) to (iii):
   (i) the reinforcing fiber strand has thicknesses T1 (μm) and T3 (μm) at both ends in a width direction of a section of the reinforcing fiber strand, and both T1 and T3 are 50 to 200% relative to a thickness T2 (μm) at a central portion of the reinforcing fiber strand;
   (ii) the reinforcing fiber strand has a number of filaments N [unit: K] and a width W [mm] that satisfy a relationship of 4.8<N/W<12; and
   (iii) filaments comprising the reinforcing fiber strand has a form fixed by a first resin material that has a glass transition temperature Tg or a melting point Tm of 40° C. or more and 200° C. or less and is heat-meltable,
   wherein the reinforcing fiber strand is 1) bound and integrated by a second resin material, and 2) kept in a relative positional relationship between one another.

7. A method of manufacturing a dry tape material for fiber placement, the method comprising binding and integrating a plurality of reinforcing fiber strands with each other by a second resin material, the plurality of reinforcing fiber strands produced by (i) and (ii) in order:
   (i) adjusting a thickness of a section of the reinforcing fiber strands so that the reinforcing fiber strands have thicknesses T1 (μm) and T3 (μm) at both ends in a width direction of the section, and both T1 and T3 are 50 to 200% relative to a thickness T2 (μm) at a central portion in the width direction, and adjusting a width of the section so that the reinforcing fiber strands have a number of filaments N [unit: K] and a width W [mm] that satisfy a relationship of 4.8<N/W<12; and
   (ii) placing a first resin material on a surface of the reinforcing fiber strands, the first resin material having a glass transition temperature Tg or a melting point Tm of 40° C. or more and 200° C. or less and being heat-meltable, and heating and cooling the first resin material to obtain the reinforcing fiber strands.

8. The method according to claim 7, wherein the first resin material placed on the surface has a particle shape in (ii) above.

9. A method of manufacturing a dry tape material for fiber placement, the method comprising binding and integrating a reinforcing fiber strand by a second resin material, the reinforcing fiber strand produced by (i) and (ii) in order:
   (i) adjusting a thickness of a section of the reinforcing fiber strand so that the reinforcing fiber strand has thicknesses T1 (μm) and T3 (μm) at both ends in a width direction of the section, and both T1 and T3 are 50 to 200% relative to a thickness T2 (μm) at a central portion in the width direction, and adjusting a width of the section so that the reinforcing fiber strand has a number of filaments N [unit: K] and a width W [mm] that satisfy a relationship of 4.8<N/W<12; and
   (ii) placing a first resin material on a surface of the reinforcing fiber strand, the first resin material having a glass transition temperature Tg or a melting point Tm of 40° C. or more and 200° C. or less and being heat-meltable, and heating and cooling the first resin material to obtain the reinforcing fiber strand.

10. The method according to claim 9, wherein the first resin material placed on the surface has a particle shape in (ii) above.

\* \* \* \* \*